US006865582B2

(12) United States Patent
Obradovic et al.

(10) Patent No.: US 6,865,582 B2
(45) Date of Patent: Mar. 8, 2005

(54) SYSTEMS AND METHODS FOR KNOWLEDGE DISCOVERY IN SPATIAL DATA

(75) Inventors: Zoran Obradovic, Dresher, PA (US); Timothy E. Fiez, Corvallis, OR (US); Slobodan Vucetic, Philadelphia, PA (US); Aleksandar Lazarevic, Philadelphia, PA (US); Dragoljub Pokrajac, Philadelphia, PA (US); Reed L. Hoskinson, Rigby, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 238 days.

(21) Appl. No.: 09/753,363

(22) Filed: Jan. 2, 2001

(65) Prior Publication Data

US 2002/0038307 A1 Mar. 28, 2002

Related U.S. Application Data

(60) Provisional application No. 60/174,389, filed on Jan. 3, 2000.

(51) Int. Cl.$^7$ .............................................. G06F 7/00
(52) U.S. Cl. ..................................... 707/104.1; 707/10
(58) Field of Search ............................... 707/10, 104.1, 707/4, 2, 102; 702/2, 179–82, 5; 700/28; 706/904, 912

(56) References Cited

U.S. PATENT DOCUMENTS

| | | | | |
|---|---|---|---|---|
| 5,467,271 A | * | 11/1995 | Abel et al. | 702/5 |
| 5,566,069 A | * | 10/1996 | Clark et al. | 702/2 |
| 5,771,169 A | * | 6/1998 | Wendte | 702/5 |
| 5,878,371 A | * | 3/1999 | Hale et al. | 702/5 |
| 6,002,984 A | * | 12/1999 | Aughenbaugh | 702/2 |
| 6,026,399 A | * | 2/2000 | Kohavi et al. | 707/6 |
| 6,058,351 A | * | 5/2000 | McCauley | 702/5 |
| 6,092,064 A | * | 7/2000 | Aggarwal et al. | 707/6 |
| 6,236,907 B1 | * | 5/2001 | Hauwiller et al. | 702/5 |
| 6,298,351 B1 | * | 10/2001 | Castelli et al. | 707/102 |
| 6,430,547 B1 | * | 8/2002 | Busche et al. | 707/1 |
| 6,460,049 B1 | * | 10/2002 | Becker et al. | 707/100 |
| 6,591,145 B1 | * | 7/2003 | Hoskinson et al. | 700/28 |
| 6,662,185 B1 | * | 12/2003 | Stark et al. | 707/100 |

OTHER PUBLICATIONS

Johannsen, Chris "Precision Framing" Apr. 1995 [online] [retrieved Dec. 5, 2002] Retrieved from Internet:<URL: http://pasture.ecn.purdue.edu/~mmorgan/PFI/over.htm>.*

(List continued on next page.)

*Primary Examiner*—Kim Vu
*Assistant Examiner*—Monplaisir Hamilton
(74) *Attorney, Agent, or Firm*—Trask Britt, P.C.

(57) ABSTRACT

Systems and methods are provided for knowledge discovery in spatial data as well as to systems and methods for optimizing recipes used in spatial environments such as may be found in precision agriculture. A spatial data analysis and modeling module is provided which allows users to interactively and flexibly analyze and mine spatial data. The spatial data analysis and modeling module applies spatial data mining algorithms through a number of steps. The data loading and generation module obtains or generates spatial data and allows for basic partitioning. The inspection module provides basic statistical analysis. The preprocessing module smoothes and cleans the data and allows for basic manipulation of the data. The partitioning module provides for more advanced data partitioning. The prediction module applies regression and classification algorithms on the spatial data. The integration module enhances prediction methods by combining and integrating models. The recommendation module provides the user with site-specific recommendations as to how to optimize a recipe for a spatial environment such as a fertilizer recipe for an agricultural field.

13 Claims, 4 Drawing Sheets

OTHER PUBLICATIONS

"Expert Systems in Agriculture" Department of Agricultural Processing, College of Agricultural Engineering, Tamil Nadu Agricultural University [online] [retrieved Dec. 5, 2002] Retrieved from Internet: <URL: http://www.technopreneur.net/.*

Koperski et al "GeoMiner" Simon Fraser University 1999 [online] [retrievied Dec. 5, 2002] Retrieved from Internet: <URL: http://www.google.com>.*

Fiez et al "A Software System for Spatial Data Analysis and Modeling" [online] [retrieved Dec. 5, 2002] Retrieved from Internet: <URL: http://www.google.com>.*

Pyle Dorian "Data Preparation for Data Mining" Morgan Kaufman 1999 Chapters 3, 7 and 10. [online] [retrieved on Dec. 5, 2002] Retrieved from Internet <URL: books24X7.com>.*

WO 99/46703 issued to Hoskinson et al. "Optimization of a recipe for a spatial environment".*

* cited by examiner

SYSTEMS AND METHODS FOR KNOWLEDGE DISCOVERY IN SPATIAL DATA

RELATED APPLICATION

This application claims priority from United States provisional application Ser. No. 60/174,389 filed Jan. 3, 2000 and is incorporated by reference.

This invention was made with United States Government support under Contract No. DE-AC07-99ID13727 awarded by the United States Department of Energy. The United States Government has certain rights in the invention.

FIELD OF THE INVENTION

The present invention relates to systems and methods for knowledge discovery in spatial data. More particularly, the present invention relates to systems and methods for mining data from a spatial database and more specifically to optimizing a recipe for a spatial environment by extracting knowledge from a spatial database.

PRIOR STATE OF THE ART

In recent years, the contemporary data mining community has developed a plethora of algorithms and methods used for different tasks in knowledge discovery within large databases. Few of the algorithms and methods are publicly available and a researcher who wishes to compare a new algorithm with existing algorithms, or analyze real data, finds the task daunting. Furthermore, as algorithms become more complex, and as hybrid algorithms combining several approaches are suggested, the task of implementing such algorithms from scratch becomes increasingly time consuming.

Current data mining techniques are unable to fully extract knowledge from high dimensional data in large spatial databases, while data analysis in typical knowledge discovery software is limited to non-spatial data.

It is also known that there is no universally best data mining algorithm across all application domains. Advances in spatial databases have allowed for the collection of huge amounts of data, for example, in various GIS applications. A subfield of data mining that deals with the extraction of implicit knowledge and spatial relationships not explicitly stored in spatial databases is called spatial data mining. However, no GIS system with significant spatial data mining functionality is currently available. There has been some spatial data mining software development, but most systems are primarily based on minor modifications of non-spatial data mining systems.

In addition, different data mining algorithms for spatial data are implemented in different programming environments. For example, interpreted languages like S-PLUS and MATLAB are sometimes slower than algorithms implemented in C or C++. To allow end-users to benefit from multiple spatial data mining approaches, there is a need for the development of a system which will integrate all implemented methods in a single environment and thus reduce user's efforts in planning their management actions.

Precision agriculture is one of the applications which will prosper from novel spatial data mining techniques. Technological advances, such as global positioning systems, combine-mounted on-the-go yield monitors, and computer controlled variable rate application equipment, provide an opportunity for improving upon the traditional approach of treating agricultural fields as homogenous data distributions. In precision agriculture, environmental characteristics at a sub-field level are used to guide crop production decisions. Instead of applying management actions and production inputs uniformly across entire fields, they are varied to better match site-specific needs, thus increasing economic returns and improving environmental stewardship. Lower costs and new sensor technologies are enabling agriculture producers to collect large quantities of site-specific data from which future site-specific management decisions can be derived. However, methodologies to efficiently interpret the meaning of these large and multi-featured data sets are lacking. Therefore, for precision agriculture and other applications, spatial data mining techniques are necessary in order to successfully perform data analysis and modeling.

Furthermore, precision agriculture data is inherently distributed at multiple farms and cannot be localized on any one machine for a variety of practical reasons including physically dispersed data sets over many different geographic locations, security services and competitive reasons. In such situations, it would be advantageous to have a distributed data mining system that can learn from large databases located at multiple sites.

A system for spatial data analysis that provides flexible machine learning tools for supporting an interactive knowledge discovery process is needed. Furthermore, that system should be functional in a large centralized or distributed database. In addition, the system should allow for rapid software development for data analysis professionals as well as systematic experimentation by spatial domain experts without prior training in machine learning or statistics.

SUMMARY OF THE INVENTION

The present invention overcomes the inability of the prior art to effectively mine usable spatial data from spatial data sources and provides systems and methods for knowledge discovery in spatial databases. In one embodiment, the data mined or extracted from spatial databases can be used to optimize a recipe for use in a spatial environment. For example, there are a variety of spatial environments in precision agriculture, such as agricultural fields, farm equipment, combines, and the like, and each one can have an associated spatial database that contains data. A spatial database for an agricultural field, for example, can contain information such as type and amount of fertilizer applied, crop yield, water use, slope, and the like. A spatial database for a combine can contain information such as variations in combine velocity, fan speed, and the like, across the field. With regard to agricultural fields, the present invention can be used to optimize a recipe for applying fertilizer to the agricultural field. The systems and methods of the present invention can be extended to other spatial environments and spatial data. The present invention is not limited to precision agriculture, but can be expanded to spatial environments such as nuclear reactors, waste dumps, environmental stewardship sites, and the like that may be described by spatial databases.

The present invention allows users to load or generate spatial data and then manipulate the spatial data as desired. The user, through a unique graphical user interface applies various spatial data mining algorithms to the spatial data. One objective of the user is to model and classify the spatial data according to spatial data mining algorithms. The user can also create new modeling algorithms based on existing algorithms which augments the ability to analyze spatial data. Yet another objective of the present invention is to allow users to discover which attributes have more influence than others. All of these objectives are achieved through a unique spatial data analysis and modeling module.

Ultimately, the results of the spatial data analysis are applied to optimize the approach to precision agriculture or other industries. For example, the results would be beneficial in providing site-specific recommendations for fertilizing a field on a point-by-point basis rather than applying the same amounts and types of fertilizer to the whole field.

The spatial data is analyzed through the spatial data analysis and modeling module, which includes a number of different modules, all of which may or may not be implemented when analyzing a particular set of spatial data. The loading module assists the user in loading or generating spatial data. The loading module also performs basic data partitioning. The inspection module provides basic statistical information such as scatterplots, histograms, QQ plots, and 2-D and 3-D surface plots. The inspection module also provides variograms and correlograms. The preprocessing module cleans up and eliminates noise in the data. The preprocessing module also allows the user to normalize and discretize the data. The user can also select or extract the most relevant attributes or generate new attributes through the preprocessing module. The partitioning module allows for more complex partitioning schemes to be used with the spatial data in order to find more homogeneous data portions. The prediction module assists the user in applying classification techniques and regression techniques in order to predict real valued variables. The integration module improves prediction methods through different integration and combining schemes provided by the present invention. Finally, the recommendation module provides the user with recommendations as to how to achieve a desired target value.

The spatial data analysis and modeling module is not limited to any particular set of spatial data mining algorithms but is flexible to adapt to newly developed algorithms and allows the user to create new prediction methods. The present invention allows for algorithms created in a number of different programming environments to be useful in a single system through unified control. Those skilled in the art will recognize that the present invention is a valuable tool which enables a user to evaluate past and present data from various sites in order to create history-based recommendations for that particular site.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to knowledge discovery in spatial data and more particularly to systems and methods for analyzing and extracting useful information from the spatial data. Analyzing and modeling spatial data in accordance uses the following modules: a data generation and manipulation module; a data inspection module; a data preprocessing module; a data partitioning module; a modeling module; and a model integration module. In some embodiments of the present invention, not all of the modules are used to successfully analyze and model the spatial data.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
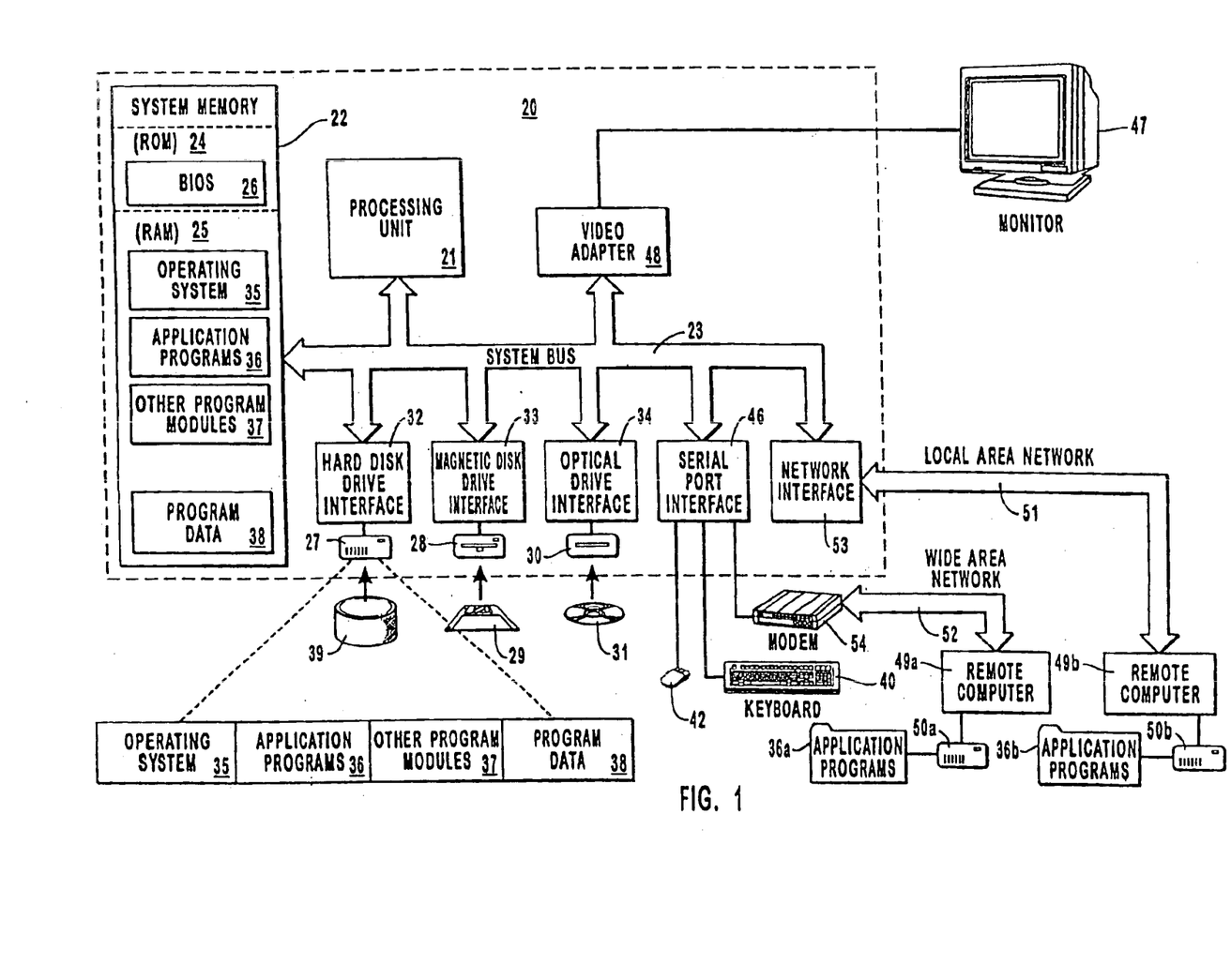
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of, bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
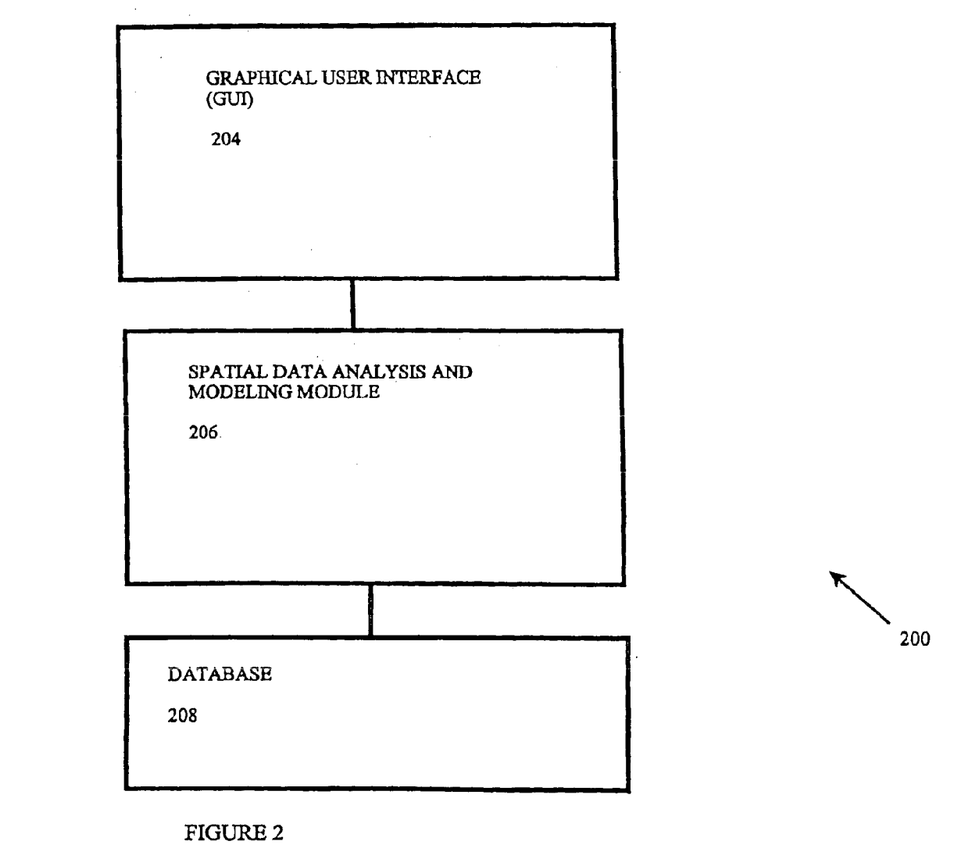
FIG. 2 illustrates a block diagram that represents an exemplary relationship among users and the spatial data analysis module of the present invention.

FIG. 2 provides an exemplary system 200 that implements one embodiment of the present invention. A user interacts with a graphical user interface (GUI) 204. Often, user access is limited by means known in the art, such as password protection, encryption, and the like. The GUI 204 may be a local, LAN or Internet interface that will allow one or more server systems to interact with one or more clients. Typically, the GUI 204 is allows a user to have access to and interact with the specific features of the spatial data analysis and modeling module (hereinafter "SDAM module") 206.

In fundamental terms, a user provides the SDAM module 206 with spatial data, which is represented by a database 208. The user manipulates and analyzes the database 208 through the GUI 204. The present invention contemplates a distinctive GUI 204 and the SDAM module 206 is adapted to the unique features and methodologies of spatial data analysis. For example, the GUI 204 allows the user to easily select spatial data mining algorithms and other functions that assist in evaluating spatial data. The SDAM module 206 includes sub-modules that are used to analyze the spatial data contained in the database 208 and extract useful information.

Figure 3:
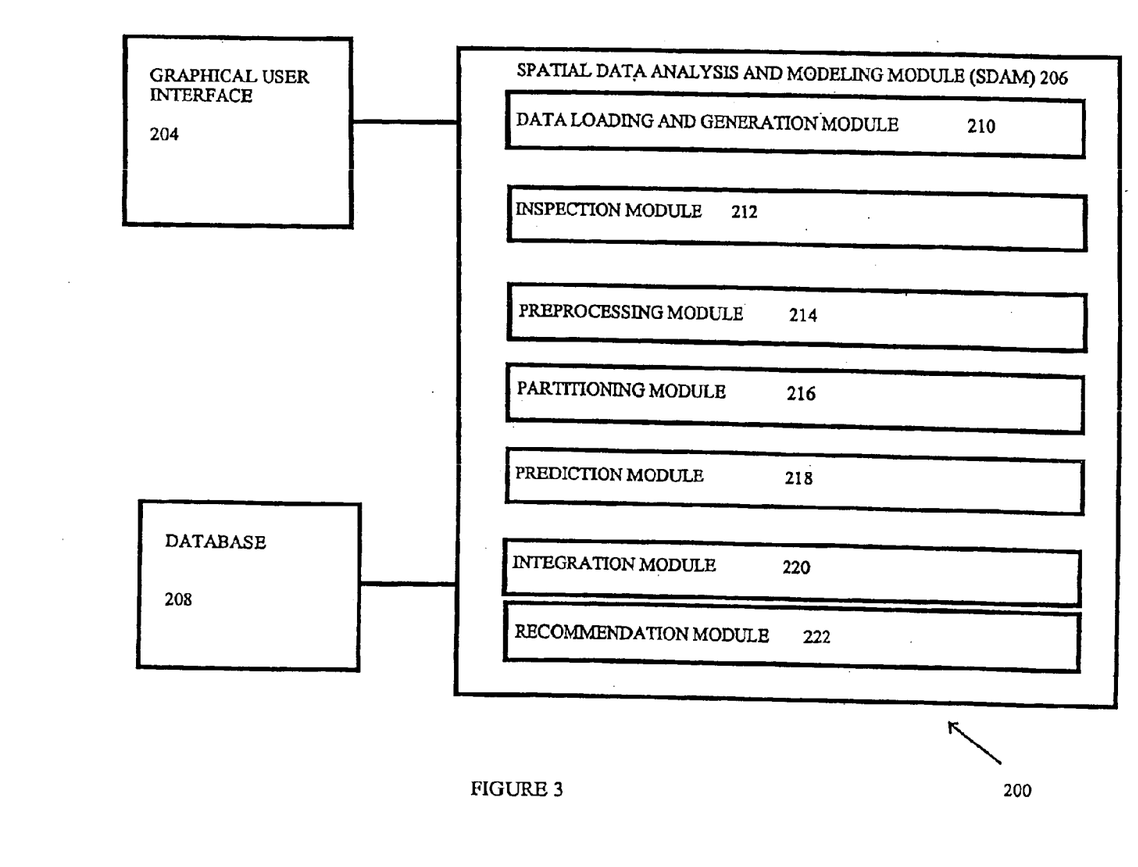
FIG. 3 illustrates a block diagram that represents the interactions between various processes of the spatial data analysis module of FIG. 2.

FIG. 3 illustrates the SDAM module 206 of the system 200 in more detail. The SDAM module 206 is preferably divided into a number of process modules. FIG. 3 shows one embodiment of the structure that SDAM module 206 may assume: data loading and generation module 210, inspection module 212, preprocessing module 214, partitioning module 216, prediction module 218, integration module 220, and recommendation module 222. It will be appreciated that not all process modules are required to implement the present invention and that certain modules may be omitted. Although the SDAM module 206 includes numerous functions useful for non-spatial data, the present invention is intended primarily for mining spatial data.

The data loading and generation module 210 is used to load spatial data from the database 208. Loading data also refers to generating data from the spatial data contained in the database 208 according to specified attributes of the database 208. An "attribute" is used to mean a characteristic of the data, for example, crop yield, nitrogen content, phosphorous content, and other soil chemistry, slope, topography, and/or water capacity. If, for example the database 208 contains agricultural spatial data, the data loading and generation module 210 can generate an attribute with nitrogen-like statistics from a wheat field. A user can use the data loading and generation module 210 to generate data sets of varying complexity and size. In another embodiment, the data loading and generation module 210 provides a spatial data simulator which generates data comparable to real-life spatial data sets. The spatial data simulator enables a user to specify various attributes of crop yield and can specify parameters for each attribute. Using those attributes based on specified parameters, the user can, for example, simulate crop yield. The user may test a certain algorithm for prediction accuracy on a known set of parameters and can instruct the data loading and generation module 210 through the GUI 204 to construct a set of spatial data accordingly. The user may also test the resolution of the sampling, the accuracy of sensors, and which attributes have more influence on crop yield than others. The benefits of spatial data simulator will be readily appreciated in that it also allows the user to test different methods on a single data set to compare the accuracy of the methods rather than testing the methods on different data sets which provides little basis for comparison. Thus, a user can evaluate and experiment with the SDAM module 206 using data sets of desired complexity and size.

The data loading and generation module 210 also provides for basic data partitioning as is sometimes desirable. Estimating data generating processes by neural networks (hereinafter "NNs") and similar methods often requires partitioning available data into training, validation and test subsets. The validation data are used to prevent over-training and the testing data are used to provide a fair assessment of a model's prediction ability. The present invention provides for different partitioning schemes depending on the complexity of the prediction method being used. Generally, simple data sets require random partitioning, while more complex prediction methods, such as NNs, may require different partitioning schemes.

In a preferred embodiment, the data loading and generation module 210 provides a data partitioning scheme based on spatial blocking of data (as compared to simple random partitioning) for deriving training, validation, and test subsets. For spatial regression experiments, preferably, the test subset should be spatially separated from the model-fitting data employed by the learning algorithm. In the data-partitioning phase, the area containing the data (a field in an agricultural example) should be split into two spatially disjoint sub-areas (sub-fields) used for model fitting and testing.

An important part of NN design process is deciding when to stop training to avoid overfitting. One preferred approach is to use part of the model-fitting data as a training set for designing the model, and to use the rest as validation data for stopping the training process. Training is halted when the mean squared error (MSE) for the validation data starts to increase. For spatially correlated training and validation sets, minimizing the error on the training subset would likely minimize the error on a randomly chosen validation subset, since each sample in the validation subset would have samples in the training subset as its spatial neighbors. Therefore, it could be expected that the training of a NN with a randomly selected validation subset would continue to the point of gross overfitting resulting in increased training time and lower generalization accuracy.

To address this problem, the data loading and generation module 210 provides a procedure that increases the separation distance between the data points of the training and validation subsets. The model-fitting portion of the field is partitioned into squares of size M×M, and half of these squares are randomly assigned for use in training and the rest for validation. One way to assign squares to the training and validation subsets is to use a regular checkerboard-like partitioning, assigning neighboring squares to different subsets. A checkerboard-like assignment has desirable packing properties maximizing the distance between the points in the two subsets for a given size of squares. The size M of each square should be selected such that the squares are sufficiently large to minimize the influence of spatial correlation between training and validation data, and still small enough to provide a training set representative of the variability of the model-fitting part of the field. The generation and manipulation of spatial data by the data loading and generation module 210 are examples of steps for loading spatial data.

The inspection module 212 primarily provides basic and spatial statistics on a particular region and its attributes. Correlograms, which are useful tools for describing the spatial variation of data, plot of the correlation coefficient as a function of the separation distance between data points. Preferably, the present invention selects M to be within a range where correlograms of all topographic features start to approach zero. This minimizes the spatial dependence between training and validation samples, and allows the validation set to better track NN generalization capabilities during the training process.

NNs fitted on the obtained spatial data partitions are going to be unstable for two reasons. First, training of feed forward multilayer NNs, as powerful nonlinear models, is very dependent on weight initialization. Second, it is influenced by the training set choice with small changes in the training set often causing larger changes in the predictor. Preferably, the integration module 220 (discussed more fully below) handles the instability of the NN models through multiple model averaging. In the bagging technique, each predictor is independently trained on N data points sampled with replacement from the N original data points of the training set and the ensemble prediction is obtained by averaging all individual predictors. Spatial bagging is provided, which consists of training a number of NNs for different random assignments of squares into training and validation subsets followed by averaging the predictions of all such NNs. This procedure allows combining desirable properties of spatial partitioning and ensemble predictors into a more powerful prediction method.

Generally, spatial data partitioning leads to significantly faster training and somewhat improved prediction as compared to using the typical random partitioning of training and validation data. Spatial data partitioning is more beneficial when used with more complex models, since the danger of overfitting increases with the model complexity. Note that a variety of means may be profitably employed to perform the functions enumerated herein, of partitioning spatial data. The above-described process simply represents one example of a method for performing these functions. It should be understood that this process is presented solely by way of example and should not be construed as limiting the scope of the present invention in any way.

After the spatial data are loaded, generated, and/or partitioned as desired, a user can select available methods with which to manipulate the data according to a default sequence suggested on the GUI 204 or in a user controlled sequence.

The inspection module 212 provides several methods for providing basic spatial and non-spatial statistics on a region and its attributes. The basic statistical information may include such first order parameters as mean and variation. Other standard measures that can be produced are histograms, scatterplots between two attributes, and schedule plots. The inspection module 212 also creates QQ plots for comparing sample distributions with a normal distribution, as well as for comparing two sample distributions. The inspection module 212 also determines the correlation coefficients between attributes which is displayed in tabular form. Preferably, all implemented operations display results in the form of charts, plots and tables through GUI 204.

The inspection module 212 also provides spatially statistical information such as the plot of the region and the spatial auto-correlation between data points in attribute space shown through 2-D and 3-D perspective figures as well as through different types of variograms and correlograms. 3-D perspective plots including contour lines can be rotated, panned and zoomed in order to observe all relevant surface characteristics of the region.

Figure 4:
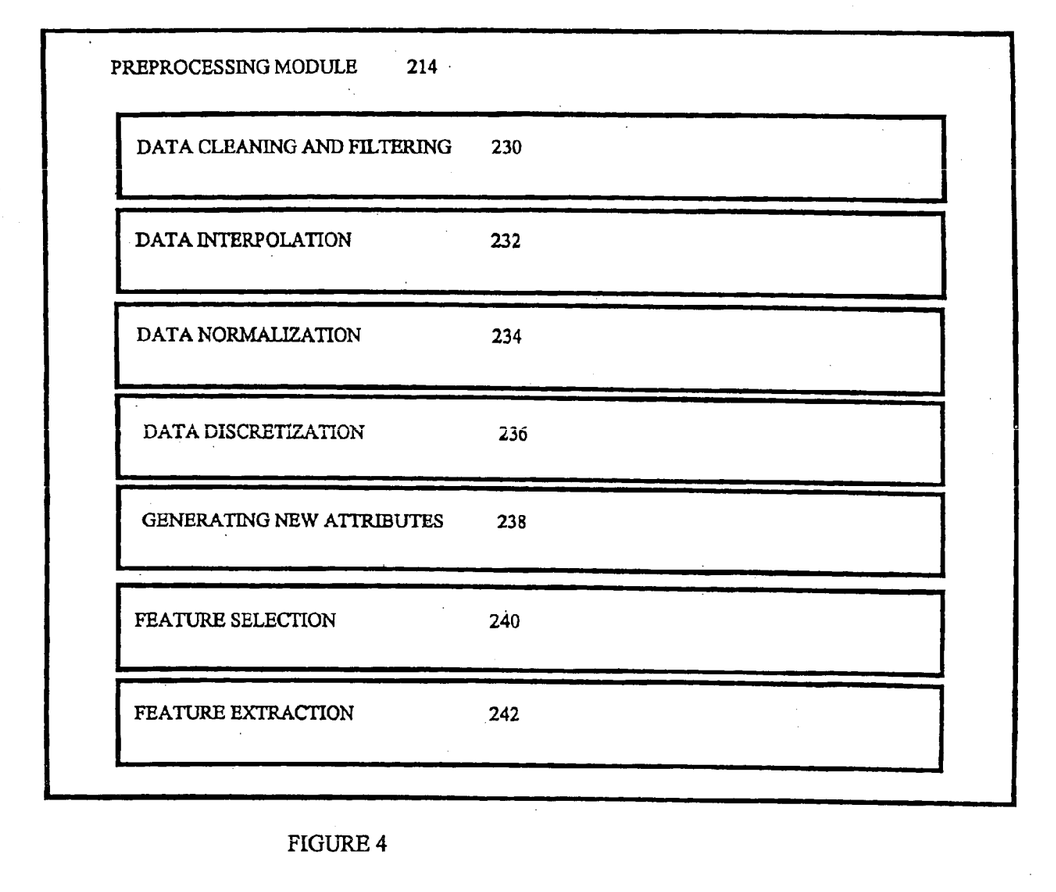
FIG. 4 illustrates a preferred embodiment of the present invention, wherein the data processing module is shown as a number of discrete functions.

The variograms and correlograms are used to characterize the spatial relationship between data points for specified attributes. In variograms, a measure of the dissimilarity between data points for distance h apart is obtained. The inspection module 212 plots the estimated variograms obtained from the experimental data, and then fits the theoretic variograms to the estimated ones. The correlograms give the same information as the variograms, except in correlograms, a measure of similarity between data points is considered. A variety of means exist to provide basic statistical information. The above-described examples represent only a few methods for performing these functions. It should be understood that these examples are presented solely by way of example and should not be construed as limiting the scope of the present invention in any way. The preprocessing module 214 provides for various preprocessing steps that are often necessary to prepare data for further modeling. Spatial data often contain large amounts of data arranged in multiple layers. These data may contain errors and may not be collected at a common set of coordinates. Thus, the preprocessing module 214 provides for steps such as data cleaning and filtering, data interpolation, data normalization, data discretization, generating new attributes, feature selection, and feature extraction. FIG. 4 illustrates functions implemented by the preprocessing module 214.

Data cleaning and filtering module 230 is sometimes necessary due to the high possibility of measurement noise during collection of the spatial data. Data cleaning consists of removing duplicate data points and value outliers, as well as spatial outliers. Data can also be filtered or smoothed by applying a median filter with a window size specified by the user. This provides missing values by averaging the points from the immediate vicinity.

In many real life spatial domain applications, the resolution (data points per area) will vary among data layers and the data will not be collected at a common set of spatial locations. Therefore, the data interpolation module 232 is necessary to apply an interpolation procedure to the data to change data resolution and to compute values for a common set of points. Interpolation techniques appropriate for spatial data, such as kriging and interpolation using the minimum curvature method, are often preferable and are provided in the present step in addition to the regular interpolation techniques such as inverse distance interpolation, triangulation techniques, and splining.

A data normalization module 234 supports at least two normalization methods. Data normalization 234 can transform the data to a normal distribution or it can scale the data to a specified range selected by user 202. A data discretization module 236 is necessary in some modeling techniques such as association rules, decision tree learning and all classification problems. The data discretization module 236 typically includes different attribute and target splitting criteria. For example, a user might discretize the data into high crop yield versus low crop yield. A user can also generate new attributes by applying supported unary and binary operators to a set of existing attributes.

In domains with a large number of attributes, the feature selection module 240 is often beneficial by removing irrelevant attributes. Generally, the feature selection module 240 allows a user to select the most relevant attributes that influence the target value (e.g., yield). At least two types of feature selection are supported. First, the user can start with one attribute and select additional attributes as desired. Second, the user, starting from a full set of attributes, can remove attributes one by one with the feature selection module 240. Thus, the user can ascertain which attributes are most relevant and have the greatest impact on prediction results.

Several selection techniques are used such as Performance Feedback Forward Selection and Backward Elimination based on linear regression mean square error (MSE) minimization. Other selection techniques such as Branch and Bound are also supported. Further, various criteria such as inter-class and probabilistic selection criteria are supported using Euclidean and Mahalanobis distance, respectively. In addition to sequential backward and forward search applied with both criteria, the branch and bound search can also be used with Mahalanobis distance. To test feature stability, feature selection methods can be applied to different data subsets, and the most stable features selected.

In contrast to the feature selection module 240 where a decision is target-based, a feature extraction module 242 provides for variance-based dimensionality reduction. The basic objective of the feature extraction module 242 is to reduce the number of attributes into a few new attributes. For example, if the data set contains 40 original attributes, the feature extraction module 240 extracts these 40 attributes into 4 or 5 new attributes.

The feature extraction module 242 typically employs both linear Principal Components Analysis and non-linear dimensionality reduction using 4-layer feed forward NNs. The targets used to train these NNs are the input vectors themselves, so that the network is attempting to map each input vector onto itself. This can be viewed as two successive functional mappings. The first mapping, defined by the first two layers, projects the original d-dimensional data into a r-dimensional sub-space (r<d) defined by the activations of the units in the second hidden layer with r neurons. Similarly, the last two layers of the NN define an inverse functional mapping from the r-dimensional sub-space back into the original d-dimensional space. The transformed data can be plotted in d-dimensional space (d=2, 3) and resulting plots can be rotated, panned and zoomed to better view possible data groupings.

A variety of other preprocessing functions may be employed in the present invention. The above-described examples represent only a few methods for preprocessing spatial data. It should be understood that these examples are presented solely by way of example and should not be construed as limiting the scope of the present invention in any way.

Referring now back to FIG. 3, the partitioning module 216 allows users to split the data set into more homogenous data segments, thus providing better modeling results. In a majority of spatial data mining problems, there are subregions wherein data points have more similar characteristics and more homogenous distributions than in comparison to data points outside these regions. In order to find these regions, the partitioning module 216 supports data partitioning according to attributes or a target value (i.e., driving variables). The partitioning module 216 can also partition using a quad tree to split a spatial region along its x and y dimensions into 4 subregions. The partitioning module 216 also supports k-means-based and distribution-based clustering designed for spatial databases and the use of entropy and information gain to partition attribute space by means of regression trees.

While global equations are adequate for problems considering a single or a few driving variables, they may not be adequate for more complex problems. In, for example, precision agriculture, the driving variables may be weed density, soil N content, and soil depth. Levels of various driving variables almost always change throughout a field, and the response to a given level of a driving variable can change within a field because of interactions with other driving variables. In addition, there are differences in data distributions and significant amounts of noise can exist.

For these more complex problems, the partitioning model 216 provides locally adapted models. The process is based on the premise that, given a rich feature set, partitioning a field into spatial regions having similar attributes (i.e., driving variables) should result in regions of similar yield responses. First, the data from all fields are analyzed in order to define spatial regions having similar characteristics. Then, regression models were built to describe the relationship between attributes and yield on the training field subset of identified spatial regions.

This process is described in more detail as follows: To eliminate irrelevant and highly correlated features, the user may use the regression-based feature selection module 240 for continuous target values and classification-based feature selection 240 for discrete target values as discussed above with reference to the preprocessing module 214. In contrast to the feature selection module 240 where a decision is often target-based, variance-based dimensionality reduction through the feature extraction module 242 can also be considered.

Using the features derived through the feature selection module 240 and feature extraction module 242, a Density-Based System for Discovering Clusters in Large Spatial Databases with Noise (hereinafter "DBSCAN") clustering method can be used to partition fields into similar regions ignoring the spatial attributes (x and y coordinates) and the yield value. The DBSCAN algorithm can be applied to merge training and testing field data. These fields need not be adjacent because the x and y coordinates were ignored in the clustering process. The DBSCAN algorithm relies on a density-based notion of clusters and was designed to discover clusters of arbitrary shape efficiently. The key idea of a density-based cluster is that for each point of a cluster its Eps-neighborhood for some given Eps>0 has to contain at least a minimum number of points (MinPts). That is, the density in the Eps-neighborhood of points has to exceed some threshold. Furthermore, the typical density of points inside clusters is considerably higher than outside of clusters. DBSCAN uses a simple but effective heuristic for determining the parameters Eps and MinPts of the smallest cluster in the database. The user can change the Eps and MinPts parameters of DBSCAN method to change the size of the resulting clusters.

Thus, the process results in $P_i$ partitions. Ideally, $P_i$ partitions should have equal area. Since the resulting partitions $P_i$ are constructed without considering spatial information, the next step is to identify the largest contiguous clusters $C_i$ inside the training part of partitions $P_i$, and also the largest contiguous clusters $T_i$ inside the test field part of partitions $P_i$. The identification of $C_i$ and $T_i$ is performed by collecting all the neighboring (x, y) points belonging to $P_i$. Note that there may be 2 or more such regions in the fields.

To further specialize prediction in each training cluster $C_i$, the user 202 can also identify subsets $L_i$, $A_i$, and $H_i$ by assigning $C_i$ data into three equal-size parts according to the yield. Hence, the subset $L_i$ corresponds to the lower 33% of the yield in $C_i$ while subsets $A_i$ and $H_i$ represent the average 33% and the highest 33% of the yield in cluster $C_i$. Thus, three yield prediction models can be fitted to each cluster in a training portion of the merged yield. For each point in the test set, its corresponding cluster is identified. Then, the nearest point from the training set which belongs to the same cluster is found and the corresponding regression model is applied.

Prediction models using prediction module 218 (described more fully below) can be developed for the entire training field, each cluster in the training field, and each part, $L_i$, $A_i$, and $H_i$, of each cluster in the training field. Linear regression models and multilayer (2-layered) feedforward NN (NN) regression models, with back-propagation learning can be trained on each spatial part $C_i$, $L_i$, $A_i$, and $H_i$ and can be applied to the corresponding neighborhood parts in the test field. For each of these models, the user can measure the Mean Square Error (MSE) of yield prediction on identified test parts.

The prediction module 218 (described more fully below) can also order $C_i$, $L_i$, $A_i$, and $H_i$ with corresponding test field data $(T_i)$ in the $P_i$ according to their distance from the $T_i$, $L_i$, $A_i$ and $H_i$ center points determined by mean. This can be measured based on Euclidean or Mahalanobis distance among the various subsets of attributes obtained through the preprocessing steps. Due to possible feature instability, the user 202 can perform an independent feature selection process for each cluster $C_i$ and use region-specific features for computing distance.

Instead of ordering the test field data, the user can use the weighted majority k-Nearest neighbor algorithm with weights inversely proportional to the distances from the center point. Other methods of ordering the test field data by distance measurement can be used to determine the appropriate model, such as, Bhatacharaya, Hand and Henley.

Thus, given training and test fields, the partitioning module 216 defines more homogenous spatial regions in both fields. The training and test fields are merged to identify spatial regions on the training field that have similar characteristics in attribute space to corresponding spatial regions in the test field. Next, the partitioning module 216 builds local regression models on spatial regions inside the training field, describing the relationship between field characteristics and yield. Using these models, locally on corresponding spatial test field regions provides better prediction on identified regions than using global prediction models. Data partitioning using clustering in this manner can be followed by similarity-based competency ordering using the prediction module 218, which is used to identify the appropriate local regression model when making predictions for unseen fields. Generally, this method of building local site-specific regression models outperforms global models.

The present invention contemplates another partitioning scheme through partitioning module 216. This advanced data partitioning approach is based on the premise that fields are heterogenous and that multiple, locally specialized models may be better suited for site-specific yield prediction than a single global model. The partitioning module 216 provides a sequence of local regressors each having a good fit on a particular training data subset, constructing distribution models for identified subsets, and using these to decide which regressor is most appropriate for each test datapoint.

Partitioning module 216 also provides an iterative data partitioning scheme based on an analysis of spatially filtered errors of multiple local regressors and the use of statistical tests for determining if further partitioning is needed for achieving homogenous regions.

A variety of methods have been developed to partition data. The above-described examples represent only a few methods for performing this function. It should be understood that these examples are presented solely by way of example and should not be construed as limiting the scope of the present invention in any way.

Prediction module 218 is used to build models that describe relationships between attributes and target values. Generally, the prediction module 218 is used in conjunction with the previous features described above and has been mentioned in some of the previous features, for example, with respect to partitioning module 216, to show that the prediction modeling steps naturally follow some of the preprocessing steps.

For novice users, an automatic configuration of the parameters used in the spatial data mining algorithms is supported. When a novice user interacts with the GUI 204 in order to model the data, the most appropriate parameters are suggested to the user through the GUI 204, according to the data sets and the selected model. More experienced data mining experts may change the proposed configuration parameters through the GUI 204 and experiment with miscellaneous algorithm settings.

The user can select from multiple classification and regression procedures through the GUI 204. Modeling functions are divided into classification and regression algorithms. In classification, the user 202 is concerned with predicting the class into which data should fall. For example, if user 202 has discretized the data into low, average, and high yield, the classification model tries to classify the data into these three classes. For regression, the user 202 is trying to predict the target value. For example, in precision agriculture, the target value is the crop yield.

The prediction module 218 provides for classification procedures using algorithms based on association rules, k-Nearest Neighbor, NNs, and the like. Linear regression procedures utilize algorithms based on linear regression models, CART regression tress, weighted k-Nearest Neighbor, NNs, and the like. One skilled in the art will recognize that classification and linear regression models are not limited to the algorithms described above and that the algorithms described above are examples of the types of algorithms and not meant to be limiting in any way.

The user can also apply tested models on a totally unseen new data set. All prediction results are graphically displayed on the GUI 204. The GUI 204 can also display the results of the NN (NN) learning process, including the learned structures of NNs and regression trees.

Given different prediction models, several methods for improving their prediction accuracy are implemented through different integration and combining schemes provided by the integration module 220. In machine learning theory, combining multiple classifiers is an effective technique for improving prediction accuracy. There are many general combining algorithms such as bagging, boosting, or Error Correcting Output Codes (ECOC) that significantly improve global classifiers like decision trees, rule learners, and NNs.

An ensemble of classifiers must be both diverse and accurate in order to improve accuracy of the whole. Diversity is required to ensure that all the classifiers do not make the same errors. In order to increase the diversity of combined classifiers for spatial heterogeneous databases with attribute instability, one cannot assume that the same set of attributes is appropriate for each single classifier. For each training sample, drawn in a bagging or boosting iteration, a different set of attributes is relevant and therefore each single classifier in iteration should use the appropriate attribute set. In addition, the application of different classifiers on spatial databases, where the data are highly spatially correlated, may produce spatially correlated errors. In such situations the standard combining methods might require different schemes for manipulating the training instances in order to keep the diversity of classifiers.

The integration module 220 provides that the boosting algorithm is modified in order to successfully deal with unstable driving attributes which are common in spatial domains. The integration module 220 provides a modification of the AdaBoost algorithm for combining multiple classifiers to improve overall classification accuracy. In each boosting round the present invention maximizes the local information for a drawn sample by changing attribute representation through attribute selection, attribute extraction and appropriate attribute weighting methods. In order to exploit the spatial data knowledge, a modification of the boosting method appropriate for heterogeneous spatial databases is provided, where at each boosting round spatial data blocks are drawn instead of the standard approach of sampling single instances.

The influence of these adjustments to single classifiers is not the same for local classifiers (e.g., k-nearest neighbor) and global classifiers (e.g., artificial NNs). Standard combining methods do not improve simple local classifiers due to correlated predictions across the outputs from multiple combined classifiers. Prediction of combined nearest neighbor classifiers can be decorrelated by selecting different attribute representations for each sample and by sampling spatial data blocks. The nearest neighbor classifier is often criticized for slow run-time performance and large memory requirements, and using multiple each sample and by sampling spatial data blocks. The nearest neighbor classifier is often criticized for slow run-time performance and large memory requirements, and using multiple nearest neighbor classifiers could further worsen the problem. Therefore, the present invention provides a method for k-nearest neighbor classification to speed up the boosting process.

The modified AdaBoost algorithm is described as follows:
1. Given: Set S $\{(x_1, y_1), \ldots, (x_m, y_m)\}$ $x_i \in X$, with labels $y_i \in Y = \{1, \ldots, k\}$
2. Initialize the distribution $D_t$ over the examples, such that $D_t(i) = 1/m$
3. For t=1, 2, 3, 4, . . . T
   Find relevant feature information for distribution $D_t$
   1. Train weak learner using distribution D
   2. Compute weak hypothesis $h_t: X' Y$ à $[0,1]$ 3. Compute the pseudo-loss of hypothesis $h_t$:

$$\varepsilon_t = \frac{1}{2} \cdot \sum_{(i,y) \in B} D_t(i, y)(1 - h_t(x_i, y_i) + h(x_i, y))$$

4. Set $\beta_t = \varepsilon_t/(1-\varepsilon_t)$
5. Update $D_t$: $D_{t+1}(i,y) = (D_t(i,y)/Z_t) \cdot \beta_t^{(1/2)-(1-h_t(x_i,y_i)+h_t(x_i,y_i))}$ Where $Z_t$ is a normalization constant chosen such that $D_{t+1}$ is a distribution 4. Output the final hypothesis:

$$h_{fn} = \underset{y \in Y}{\operatorname{argmax}} \sum_{t=1}^{T} \left( \log \frac{1}{\beta_t} \right) \cdot h_t(x, y)$$

The modified algorithm maintains a distribution $D_t$ over the training examples, which can be initially uniform. The algorithm proceeds in a series of T rounds. In each hypothesis $h_t$. The distribution is updated to give wrong classifications higher weights than correct classifications.

Since each boosting iteration t will have different training samples drawn according to the distribution $D_t$, at the beginning of the "for loop" described above, the present invention modifies the standard algorithm by adding step 0., wherein, a different attribute representation for each sample is chosen. Different attribute representations are realized through attribute selection, attribute extraction and attribute weighting processes through boosting iterations. This forces individual classifiers to make different and uncorrelated errors.

Error correlation is related to Breiman's concept of stability in classifiers. Nearest neighbor classifiers are stable to the patterns, so bagging and boosting generate poor k-NN ensembles. Nearest neighbor classifiers, however, are extremely sensitive to the attributes used. This process attempts to use this instability to generate a diverse set of local classifiers with uncorrelated errors. At each boosting round, one of the following methods is performed to determine a suitable attribute space for each use in classification.

To eliminate irrelevant and highly correlated attributes, regression-based attribute selection is performed through performance feedback forward selection and backward elimination search techniques based on linear regression mean square error (MSE) minimization. The r most relevant attributes are selected according to the selection criterion at each round of boosting, and are used by the k-NN classifiers.

In contrast to attribute selection where a decision is target-based, variance-based dimensionality reduction through attribute extraction is also considered. Here, linear Principal Components Analysis (PCA) can be employed. Each of the k-NN classifiers uses the same number of new transformed attributes. Another possibility is to choose an appropriate number of newly transformed attributes which will retain some predefined part of the variance.

The attribute weighting method used in the provided method is based on a 1-layer feedforward NN. First, integration module 220 performs target value prediction for the drawn sample with defined a 1-layer feedforward NN using all attributes. This kind of NN can discriminate relevant from irrelevant attributes. Therefore, the NNs interconnection weights are taken as attribute weights for the k-NN classifiers.

To further test attribute stability properties, miscellaneous attribute selection algorithms can be applied on the entire training set and the most stable attributes selected. Then the standard boosting method can be applied to the k-NN classifiers using the identified fixed set of attributes at each boosting iteration. When boosting is applied with attribute selection at each boosting round, the attribute occurrence frequency is monitored in order to compare the most stable selected attributes. When attribute subsets selected through boosting iterations become stable, this can be an indication to stop the boosting process.

The modified algorithm for combining multiple classifiers can result in significantly better predictions over existing classifier ensembles, especially for heterogeneous data sets with attribute instabilities. By manipulating the attribute representation used by individual classifiers at each boosting round, the classifiers can be more decorrelated, thus leading to higher prediction accuracy. The attribute stability test serves as a good indicator for proper stopping of further boosting iterations. Generally, a small number of iterations is needed in order to achieve the same final prediction accuracy.

The present invention also contemplates methods for spatial boosting of k-NN classifiers, adaptive attribute and spatial boosting for NN classifiers, and a fast k-NN algorithm. A variety of methods have been developed to combine and integrate prediction models. The above-described examples represent only a few methods for performing this function. It should be understood that these examples are presented solely by way of example and should not be construed as limiting the scope of the present invention in any way.

The recommendation module 222 provides user 202 with recommendations as to how to achieve a specific target value. For example, in precision agriculture, the user is interested in obtaining the best crop yield (the target value). Thus, the user must know how much fertilizer (i.e., nitrogen, phosphorous, etc.) to apply on each point of the field based on the results of the data analysis. The recommendation module 222 takes the results of the spatial data analysis and provides a map of the field and indicates how much fertilizer should be applied to each point on the field.

The recommendation module 222 may provide different types of information. For example, the recommendation module 222 could be converted into a fertilizer module, meaning that the parameter that is evaluated is how much fertilizer should be applied to each point based on the spatial data analysis. Or the recommendation module could be converted into an irrigation module which would evaluate how much to irrigate the field at predetermined points. Other examples include pesticide module, herbicide module, seed-variety spacing module, and the like.

One example of how the recommendation module could be implemented is described in U.S. Provisional application S/N 60/077,583, filed on Mar. 10, 1998, incorporated herein by reference. The recommendation module can be used to create "recipes" for optimizing the treatment of spatial environments. The results of the spatial data analysis provided by the present invention can be used to create optimal recipes for various treatments which include, but are not limited to, a fertilizer schedule, an irrigation schedule, a herbicide schedule, a pesticide schedule, a seed-variety spacing schedule, an agricultural equipment schedule, and the like.

The present invention provides for prediction of values of a specific field by interpolating from various tested point or block sampling. A recipe for optimizing, for example, nitrogen levels would occur through the following steps. The analysis begins by obtaining a fact from the spatial database.

A preliminary determination about the obtained fact is made against the backdrop of the current statements to see if the fact can or cannot be executed. If the fact cannot be executed, the fact is discarded. An example of non-compliance and discarding is as follows: if the fact states "keep nitrogen below 42 ppm for wheat production" and a current statement indicates that the soil at a particular site in a field for growing wheat is determined to be 46 ppm nitrogen, the fact cannot be executed; the fact is then discarded. Discarding of the facts in this manner eliminates superfluous data from being considered when the recipe is being devised. Thus the final recipe is free from extraneous data. Once discarded, the method then ascertains whether other facts are available. If so, the steps are iteratively processed until all facts have been examined.

If the fact can be executed, then the method isolates facts that can be executed and groups these facts together as "stored facts." Stored facts are merely a means for describing the computer-executable instructions for isolating and/or maintaining facts until such time as they are further considered as part of the recipe.

After ascertaining the first fact, the method then proceeds to evaluate another fact, for example, economic considerations to determine if the stored facts also meet economic criteria. Once all the facts are evaluated, the method has provided a recipe whereby the agriculturalist is enabled to most economically fertilize the agricultural field.

Another advantage of the recommendation module 222 is that it provides results which can be utilized in systems that monitor agricultural machinery and make real time adjustments to the agricultural machinery such that the operation of the machinery is optimized. The optimization can be related to the crop yield or other quality standards or group of standards. The optimization of the agricultural machinery is performed by analyzing data through the systems and methods of the present invention and then relaying that information directly or wirelessly to agricultural machinery equipped to modify output of measurements. The results from the present invention in conjunction with the autonomous control of agricultural machinery provide for optimum yields, with minimum human effort. For example, once the recommendation module 222 has completed analyzing a set of agricultural data, the recommendations can be relayed to agricultural equipment which will automatically modify the output of fertilizer depending on the specific geographic point, thus optimizing the crop yield.

Thus, the SDAM module 206 provides various systems and methods allow a user to effectively predict and analyze spatial data. The present invention provides for virtually all existing algorithms presently being used in the area of spatial data mining to be implemented in the methods and systems described because new algorithms can be added to the SDAM module 206. One skilled in the art will appreciate that the SDAM module 206 is provided with remarkable flexibility to assist a user in an interactive knowledge discovery process. The SDAM module 206 in essence supports the whole knowledge discovery process.

One skilled in the art will recognize that the systems and methods of the present invention can be readily applied to spatial data in precision agriculture. Agricultural producers are collecting large amounts of spatial data using global positioning systems to georeference sensor readings and sampling locations. Based on the interpretation of spatial data sets that include features such as topography, soil type, soil fertility levels, remotely sensed crop yields, management decisions can be varied instead of keeping them constant across an entire field area. The systems and methods of the present invention offer the potential to develop site-specific regression functions from spatial agricultural data that, given the ability to predict yield response, would allow calculation of optimum levels of production inputs.

One advantage that can be readily appreciated is that the present invention provides researchers with the ability to use the knowledge obtained from one data set and extrapolate this knowledge to different agricultural sites, or to the same site, but different years. This is possible because one objective of the present invention is to explain yield variability as a function of the site-specific driving variable. In other words, the present invention provides the ability to analyze how different attributes affect the target value. This objective differs from the majority of research encountered in geostatistics or spatial econometrics where the goal is limited to spatial interpolation, that is, simply obtaining the target value. This ability is a valuable tool that will lead to more efficient and productive management.

The SDAM module 206 described above contains the flexibility to provide a number of different algorithms in a number of different programming environments. The present invention provides for a unified GUI 204 which is compatible with more than one programming environment. The SDAM module 206 also contains the flexibility to add more algorithms to its files as more algorithms are developed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a system including spatial data for a spatial environment, wherein a recipe is used in the spatial environment, a method for mining the spatial data to optimize the recipe for one or more target values, the method comprising:

an act of generating a data set from the spatial data using identified attributes selected by a user, the data set being varyingly complex based upon the identified attributes selected by the user;

an act of partitioning the spatial data into a training set and at least one modeling set wherein the act of partitioning is selected from the group consisting of: selecting the training set such that the training set comprises a substantially homogenous spatial relationship to the at least one modeling set, and selecting the training set such that the training set comprises a substantially separate spatial relationship to the at least one modeling set;

an act of inspecting the generated data set to provide statistical information for the data set;

an act of preprocessing the data set to prepare the data set for modeling;

an act of modeling the preprocessed data set to describe relationships between the attributes and the one or more target values; and an act of providing recommendations such that the recipe is optimized.

2. A method as defined in claim 1, wherein the act of preprocessing the data set further comprises:

an act of cleaning the generated data set;

an act of interpolating the generated data set;

an act of normalizing the generated data set; and an act of generating new attributes.

3. A method as defined in claim 1, wherein the recipe is a fertilizer recipe for use in an agricultural field.

4. A method as defined in claim 1, wherein a crop yield is included in the one or more target values.

5. A method as defined in claim 1, further wherein the relationships include relationships between the training set and the at least one modeling set, wherein the training set is' used to optimize a recipe for the at least one modeling set.

6. A computer program product having computer executable instructions for executing the acts recited in claim 1.

7. In a system including one or more spatial databases corresponding to one or more spatial environments, a system for knowledge discovery from the one or more spatial databases, the system comprising:

a user interface; and a spatial data modeling and analysis module (SDAM module) for extracting knowledge from the one or more spatial databases, the SDAM module comprising:

a data generation and manipulation module for loading a data set from the one or more spatial databases based on designated attributes, wherein the attributes are selected and supplied to the data generation and manipulation module by a user through the user interface;

a data inspection module for providing spatial statistics on the loaded data set;

a data preprocessing module for preparing the loaded data set for modeling, wherein the data preprocessing module removes errors from the loaded data set;

a data partitioning module for dividing the loaded data set into a training set and at least one modeling set wherein the dividing is selected from the group consisting of:

dividing such that the training set comprises a substantially homogeneous spatial relationship to the at least one modeling set, and dividing such that the training set comprises a substantially separate spatial relationship to the at least one modeling set; and a modeling module for describing relationships between the attributes and one or more target values, wherein the relationships are obtained from the training set and applied to the at least one modeling set.

8. A system as defined in claim 7, wherein the SDAM module further comprises an integration module for enhancing the knowledge generated from the one or more spatial databases.

9. A system as defined in claim 7, wherein the preprocessing module further comprises:

a cleaning and filtering module for removing duplicate data and removing noise from the loaded data set;

a data interpolation module for computing common values for a common set of locations;

a data normalization module for transforming the loaded data set to a normal distribution and for scaling the loaded data set to a range;

a data discretization module for use in modeling the loaded data set;

a generating new attributes module for combining existing attributes into a single attribute;

a feature selection module for reducing the attributes identified by a user such that irrelevant attributes may be removed; and a feature extraction module for reducing a dimensionality of the loaded data set.

10. A system as defined in claim 7, further comprising a recommendation module, wherein the recommendation module optimizes a recipe for a spatial environment.

11. A system as defined in claim 10, wherein the recommendation module includes at least one of: a fertilization module for optimizing a fertilizer recipe to be applied to an agricultural field; an irrigation module for optimizing a water recipe to be applied to a field; and an equipment module for optimizing a recipe to be applied to equipment.

12. A system as defined in claim 11, wherein the recommendation module includes at least one of: a pesticide module, a herbicide module, and a seed-spacing module.

13. A system as defined in claim 7, wherein each of the data generation and manipulation module, the data inspection, the data preprocessing module, the data partitioning module, and the modeling module can be independently controlled by the user through the user interface.

* * * * *